United States Patent
Valencia Flores et al.

(10) Patent No.: US 10,604,051 B2
(45) Date of Patent: Mar. 31, 2020

(54) FLIPPER PANEL SYSTEM

(71) Applicant: GM GLOBAL TECHNOLOGY OPERATIONS LLC, Detroit, MI (US)

(72) Inventors: Juan Carlos Valencia Flores, Toluca (MX); Omar Rene Hernandez Sanchez, Toluca (MX)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 73 days.

(21) Appl. No.: 15/992,864

(22) Filed: May 30, 2018

(65) Prior Publication Data
US 2019/0366899 A1 Dec. 5, 2019

(51) Int. Cl.
*B60N 2/90* (2018.01)
*B60R 7/04* (2006.01)
*B60N 2/20* (2006.01)

(52) U.S. Cl.
CPC .............. *B60N 2/90* (2018.02); *B60N 2/206* (2013.01); *B60R 7/043* (2013.01)

(58) Field of Classification Search
CPC ............ B60N 2/90; B60N 2/206; B60R 7/043
See application file for complete search history.

(56) References Cited

U.S. PATENT DOCUMENTS

| | | | | |
|---|---|---|---|---|
| 3,334,941 | A * | 8/1967 | Krasinski .............. | B60N 2/3011 296/66 |
| 6,598,926 | B1 * | 7/2003 | Price ........................ | B60N 2/06 296/65.09 |
| 6,702,355 | B1 * | 3/2004 | Price ....................... | B60R 5/045 296/37.16 |
| 2003/0042749 | A1 * | 3/2003 | Tourangeau ......... | B60N 2/3013 296/63 |
| 2006/0061120 | A1 * | 3/2006 | Czerwinski .............. | B60N 2/06 296/63 |
| 2010/0327635 | A1 * | 12/2010 | Whalen ................ | B60N 2/3013 297/129 |
| 2011/0248523 | A1 * | 10/2011 | Aebker .................... | B60N 2/36 296/66 |
| 2017/0080869 | A1 * | 3/2017 | Clifford .................... | B60R 7/04 |

\* cited by examiner

*Primary Examiner* — Lori L Lyjak
(74) *Attorney, Agent, or Firm* — Lorenz & Kopf, LLP

(57) ABSTRACT

In various embodiments, seating systems and provided for vehicles that include an occupant seat, a cargo device, and a flipper panel. The flipper panel is disposed between the occupant seat and the cargo device. The flipper panel includes a flat spring and a housing. The housing is configured to be disposed between the occupant seat and the cargo device, and includes a plurality of walls configured to hold the flat spring in place against the housing when the flipper panel is installed in the seating system for the vehicle.

20 Claims, 6 Drawing Sheets

FLIPPER PANEL SYSTEM

TECHNICAL FIELD

The technical field generally relates to the field of vehicles and, more specifically, to flipper panel systems between occupant seats and cargo devices for vehicles.

INTRODUCTION

Many vehicles include occupant seats having cargo devices underneath, and flipper panels therebetween. With certain types of vehicles, it may be desirable to provide different mechanisms for flipper panels between occupant seats and cargo devices.

Accordingly, it is desirable to provide flipper panel systems for occupant seats for vehicles, for example that can provide a space saving and/or robust solution for the vehicle. Furthermore, other desirable features and characteristics of the present invention will become apparent from the subsequent detailed description and the appended claims, taken in conjunction with the accompanying drawings.

SUMMARY

In one exemplary embodiment, a flipper panel is provided. The flipper panel is configured for installation in a seating system of a vehicle that includes an occupant seat and a cargo device. The flipper panel includes a flat spring and a housing. The flat spring is configured to be disposed between the occupant seat and the cargo device, and includes a plurality of walls configured to hold the flat spring in place against the housing when the flipper panel is installed in the seating system for the vehicle.

Also in one embodiment, the flat spring is "T" shaped; and the plurality of walls form a "T" shaped feature for holding the flat spring against the housing.

Also in one embodiment, the flipper panel includes a living hing a living hinge that is formed into the housing.

Also in one embodiment, the housing includes: a first side having a carpet layer; and a second side, opposite the first side, having a plastic layer in which the plurality of walls are disposed to hold the flat spring in place.

Also in one embodiment, the plurality of walls define a plurality of openings for holding the flat spring in place against the housing.

Also in one embodiment, the plurality of walls are disposed above a surface of the housing, generating the plurality of openings above and against the surface.

Also in one embodiment, the plurality of walls include multiple sets of parallel and perpendicular walls that form a plurality of rectangular openings for holding the flat spring in place against the housing.

Also in one embodiment, the plurality of walls includes: a first wall that extends in a first direction; second and third walls that extend from opposing ends of the first wall, in a second direction that is perpendicular to the first wall; fourth and fifth walls that extend from lower ends of the second and third walls, respectively, in a third direction that is perpendicular to the second and third walls; sixth and seventh walls that extend from the fourth and fifth walls, respectively, in a fourth direction that is perpendicular to the fourth and fifth walls; an eighth wall that extends between the sixth and seventh walls at a first location, in a fifth direction that is perpendicular to the sixth and seventh walls; a ninth wall that extends between the sixth and seventh walls at a second location that is below the first location, in a sixth direction that is parallel to the eighth wall; and a tenth wall that extends parallel to the ninth wall, at a third location that is below the second location.

In another exemplary embodiment, a eating system for a vehicle is provided that includes an occupant seat, a cargo device, and a flipper panel. The flipper panel is disposed between the occupant seat and the cargo device, and includes a flat spring and a housing. The housing is configured to be disposed between the occupant seat and the cargo device, and includes a plurality of walls configured to hold the flat spring in place against the housing when the flipper panel is installed in the seating system for the vehicle.

Also in one embodiment, the flat spring is "T" shaped; and the plurality of walls form a "T" shaped feature for holding the flat spring against the housing.

Also in one embodiment, the flipper panel further includes a living hinge formed into the housing; and the housing includes: a first side having a carpet layer; and a second side, opposite the first side, having a plastic layer in which the plurality of walls are disposed to hold the flat spring in place.

Also in one embodiment, the plurality of walls define a plurality of openings for holding the flat spring in place against the housing.

Also in one embodiment, the plurality of walls are disposed above a surface of the housing, generating the plurality of openings above and against the surface.

Also in one embodiment, the plurality of walls include multiple sets of parallel and perpendicular walls that form a plurality of rectangular openings for holding the flat spring in place against the housing.

Also in one embodiment, the plurality of walls includes: a first wall that extends in a first direction; second and third walls that extend from opposing ends of the first wall, in a second direction that is perpendicular to the first wall; fourth and fifth walls that extend from lower ends of the second and third walls, respectively, in a third direction that is perpendicular to the second and third walls; sixth and seventh walls that extend from the fourth and fifth walls, respectively, in a fourth direction that is perpendicular to the fourth and fifth walls; an eighth wall that extends between the sixth and seventh walls at a first location, in a fifth direction that is perpendicular to the sixth and seventh walls; a ninth wall that extends between the sixth and seventh walls at a second location that is below the first location, in a sixth direction that is parallel to the eighth wall; and a tenth wall that extends parallel to the ninth wall, at a third location that is below the second location.

In another exemplary embodiment, a vehicle is provided that includes a body, a propulsion system, and a seating system. The propulsion system is configured to move the body. The seating system is disposed within the body, and includes an occupant seat; a cargo device; and a flipper panel disposed between the occupant seat and the cargo device. The flipper panel includes a flat spring and a housing. The housing is configured to be disposed between the occupant seat and the cargo device, and includes a plurality of walls configured to hold the flat spring in place against the housing when the flipper panel is installed in the seating system for the vehicle.

Also in one embodiment, the flat spring is "T" shaped; and the plurality of walls form a "T" shaped feature for holding the flat spring against the housing.

Also in one embodiment, the flipper panel further includes a a living hinge formed into the housing; and the housing includes: a first side having a carpet layer; and a second side, opposite the first side, having a plastic layer in which the plurality of walls are disposed to hold the flat spring in place.

Also in one embodiment, the plurality of walls define a plurality of openings for holding the flat spring in place against the housing; and the plurality of walls include multiple sets of parallel and perpendicular walls that form a plurality of rectangular openings for holding the flat spring in place against the housing.

Also in one embodiment, the plurality of walls includes: a first wall that extends in a first direction; second and third walls that extend from opposing ends of the first wall, in a second direction that is perpendicular to the first wall; fourth and fifth walls that extend from lower ends of the second and third walls, respectively, in a third direction that is perpendicular to the second and third walls; sixth and seventh walls that extend from the fourth and fifth walls, respectively, in a fourth direction that is perpendicular to the fourth and fifth walls; an eighth wall that extends between the sixth and seventh walls at a first location, in a fifth direction that is perpendicular to the sixth and seventh walls; a ninth wall that extends between the sixth and seventh walls at a second location that is below the first location, in a sixth direction that is parallel to the eighth wall; and a tenth wall that extends parallel to the ninth wall, at a third location that is below the second location.

DESCRIPTION OF THE DRAWINGS

The present disclosure will hereinafter be described in conjunction with the following drawing figures, wherein like numerals denote like elements, and wherein.

DETAILED DESCRIPTION OF THE DRAWINGS

The following detailed description is merely exemplary in nature and is not intended to limit the disclosure or the application and uses thereof. Furthermore, there is no intention to be bound by any theory presented in the preceding background or the following detailed description.

Figure 1:
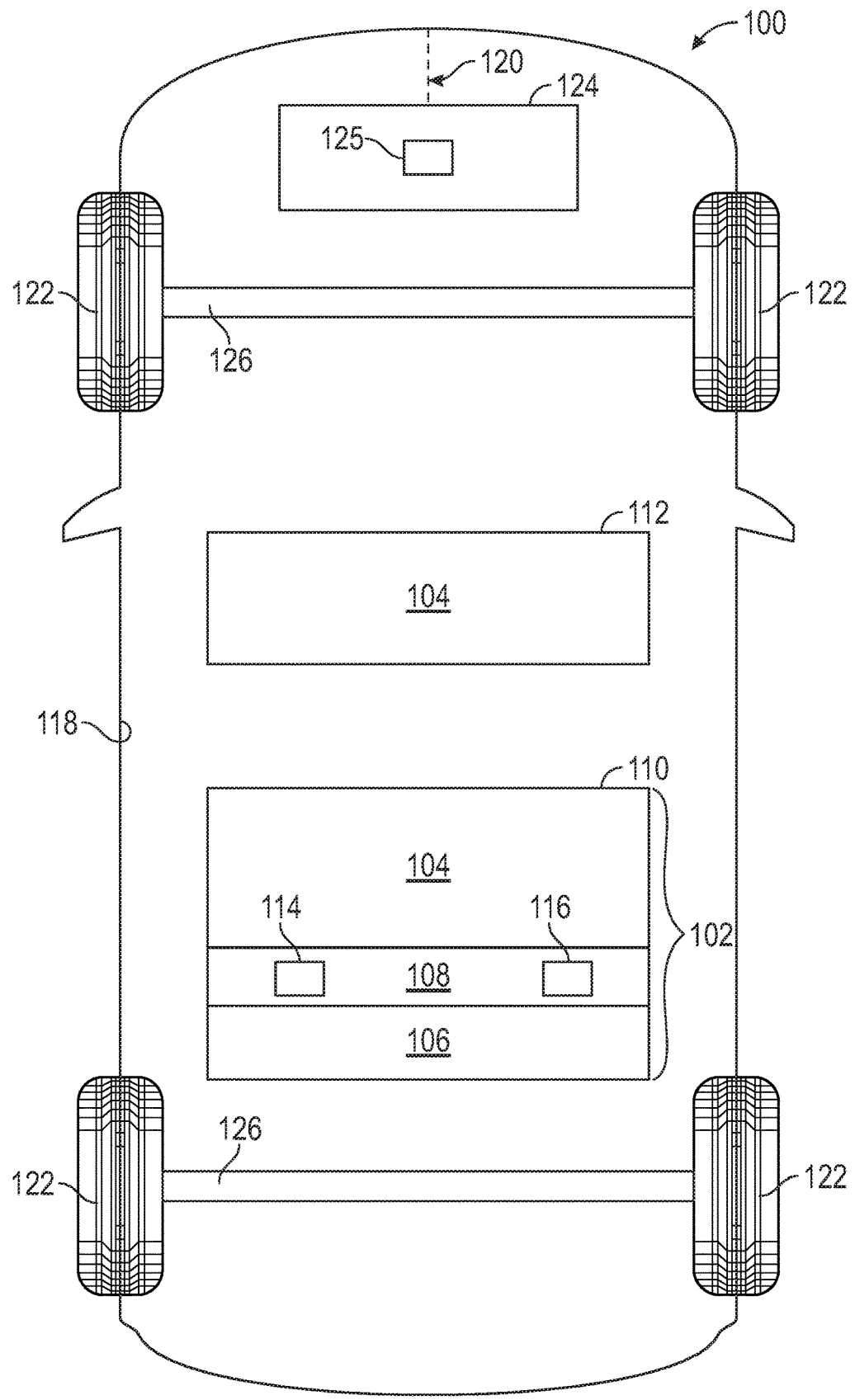
FIG. 1 is a functional block diagram of a vehicle, namely an automobile, that includes a seating system having an occupant seat, a cargo device, and a flipper panel in between, the flipper panel having a flat spring and a "T" feature, in accordance with exemplary embodiments.

FIG. 1 illustrates a vehicle 100 having a seating system 102, in accordance with exemplary embodiments. As described in greater detail below, in various embodiments, the seating system 102 includes one or more occupant seats 104, a cargo device 106, and a flipper panel 108.

As depicted in FIG. 1, in various embodiments the seating system 102 is implemented in connection with a rear occupant seat 110. In certain other embodiments, the seating system 102 may also be implemented in connection with a front occupant seat 112.

Also in various embodiments, the cargo device 106 comprises a cargo bin that is disposed beneath the occupant seat 104. In addition, in various embodiments, the flipper panel 108 is coupled between the cargo device 106 and the occupant seat 104. In addition, in various embodiments, as discussed further below in connection with FIGS. 2-10, in various embodiments the flipper panel 108 includes both a flat spring 114 and a housing 116 having a "T" shaped feature.

As depicted in FIG. 1, in certain embodiments, the vehicle 100 comprises an automobile. It will be appreciated that the seating system 102 described herein may be implemented in any number of different types of vehicles and/or platforms. For example, in various embodiments, the vehicle 100 may comprise any number of different types of automobiles (e.g., taxi cabs, vehicle fleets, buses, sedans, wagons, trucks, sport utility vehicles, and other automobiles), other types of vehicles (e.g., marine vehicles, locomotives, aircraft, spacecraft, and other vehicles), and/or other mobile platforms, and/or components thereof.

As noted above, in the depicted embodiment, the seating system 102 is for a rear occupant seat 110 of the vehicle 100. In various embodiments, the rear occupant seat 110 may comprise a seating bench, one or more bucket seats, and/or one or more other types of seating configurations for occupants in one or more rear rows of seating, behind a driver and/or front occupant seats 112 of the vehicle 100. It will be appreciated that in certain embodiments seating systems 102 may be installed in multiple rear occupant seats 110. It will also be appreciated that in certain other embodiments, a seating system 102 may be installed in the front occupant seats 112, instead of or in addition to the rear occupant seat(s) 104.

In various embodiments, the vehicle 100 includes a body 118 that is arranged on a chassis 120. The body 118 substantially encloses other components of the vehicle 100. The body 118 and the chassis 120 may jointly form a frame. The vehicle 100 also includes a plurality of wheels 122. The wheels 122 are each rotationally coupled to the chassis 120 near a respective corner of the body 118 to facilitate movement of the vehicle 100. In one embodiment, the vehicle 100 includes four wheels 122, although this may vary in other embodiments (for example for trucks and certain other vehicles).

A drive system 124 is mounted on the chassis 120, and drives the wheels 122, for example via axles 126. The drive system 124 preferably comprises a propulsion system 125. In certain exemplary embodiments, the drive system 124 comprises an internal combustion engine and/or an electric motor/generator, coupled with a transmission thereof. In certain embodiments, the drive system 124 may vary, and/or two or more drive systems 124 may be used. By way of example, the vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

As depicted in FIG. 1 and noted above, the seating system 102 includes the above-referenced occupant seat 104, cargo device 106, and flipper panel 108. These components will be discussed in greater detail below in connection with FIGS. 2-10.

Figure 2:
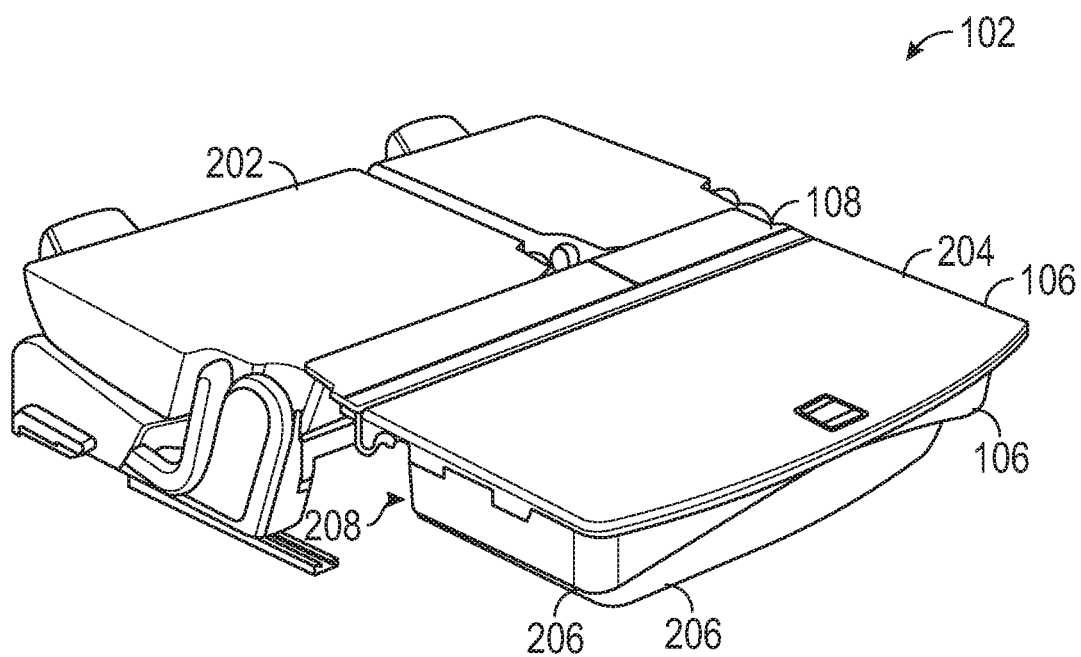
FIGS. 2 and 3 are perspective views of the seating system of FIG. 1, in accordance with exemplary embodiments.
Figure 3:
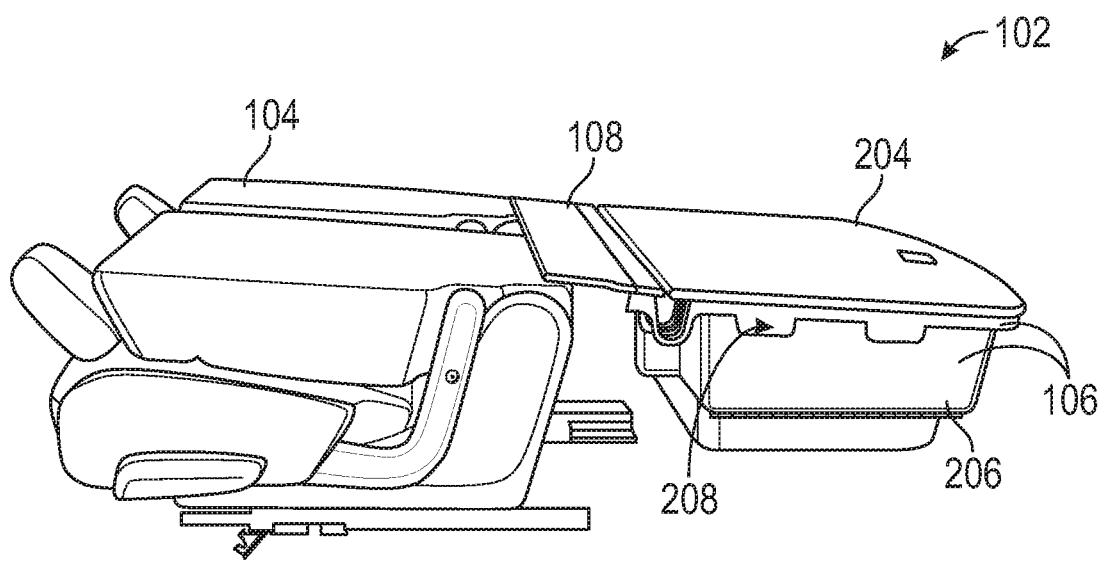

FIGS. 2 and 3 are perspective views of the seating system 102 of FIG. 1, in accordance with exemplary embodiments. As depicted in FIGS. 2 and 3, in various embodiments, the occupant seat 104 includes a rear surface 204, for example comprising a backrest (or a region behind a backrest) for the occupant seat 104. Also as depicted in FIGS. 2 and 3, in various embodiments, the cargo device 106 includes a rear surface 204 and a plurality of side surfaces 206 that define a storage space 208 therebetween. Also as depicted in FIGS. 2 and 3, in various embodiments, the rear surface 204 of the cargo device 106 is parallel (or substantially parallel) to the rear surface 202 of the occupant seat 104. In addition, in various embodiments, the flipper panel 108 extends between the respective rear surfaces 202, 204 of the occupant seat 104 and the cargo device 106, and is connected to the rear surface 204 of the cargo device 106.

Figure 4:
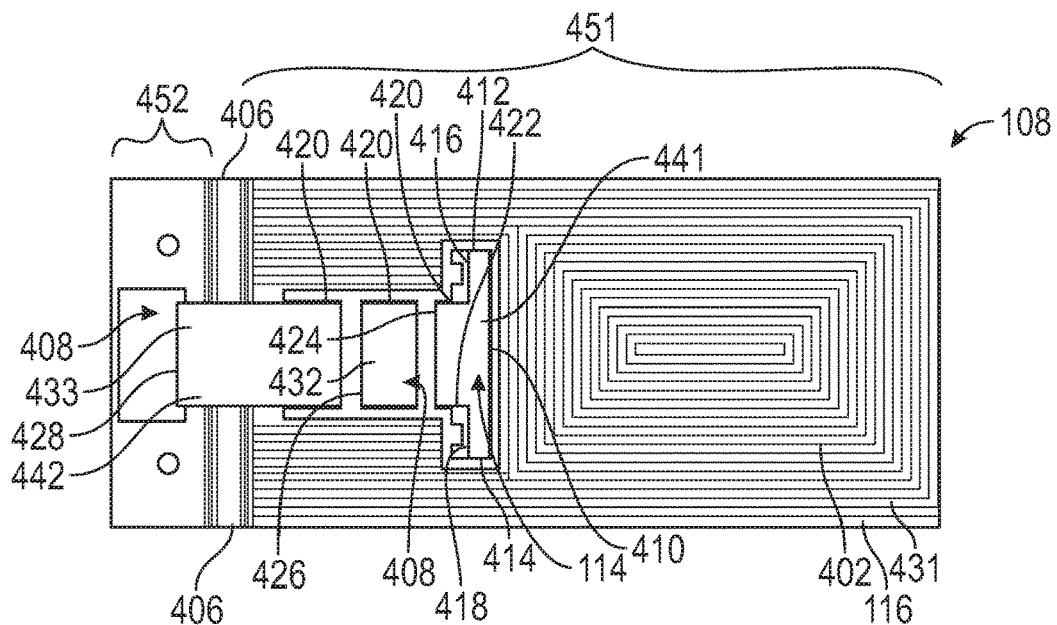
FIGS. 4-10 are various views of the flipper panel of the seating system of FIGS. 1-3, in accordance with exemplary embodiments.
Figure 5:
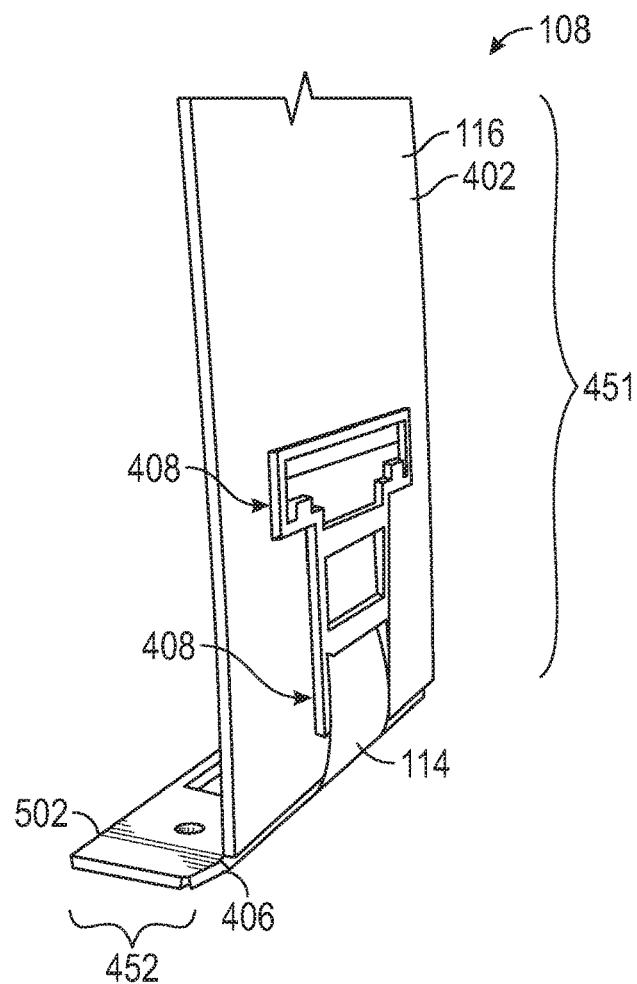

FIGS. 4-10 are various views of the flipper panel 108 of the seating system 102 of FIGS. 1-3, in accordance with exemplary embodiments. First, FIGS. 4 and 5 provide first and second views showing the flipper panel 108 in an unbent state and a bent state, respectively.

As shown in FIGS. 4 and 5, the flipper panel 108 includes a housing 116 and a flat spring 114 (as noted above in connection with FIG. 1). In various embodiments, the housing 116 is made at least in part of a plastic material, and the flat spring 114 is made of a metal material. Also as discussed below, in various embodiments, a living hinge 406 and a "T" shaped feature 408 are formed within the housing 116. Also as shown in FIGS. 4 and 5, the housing 116 includes an upper region 451 (i.e., above the living hinge 406) that does not bend, and a lower region 452 (i.e., below the living hinge 406) that bends via the living hinge 406 (e.g., that bends or moves along with the occupant seat 104).

FIG. 4 shows the bottom surface 402 of the housing 116. In various embodiments, the bottom surface 402 is made of plastic. As shown in FIG. 4, in various embodiments, the flipper panel 108 includes a "T" shaped feature 408 that is formed by the housing 116. Specifically, in various embodiments, the "T" shaped feature 408 comprises a "T" shaped plurality of openings that are proximate the bottom surface 402 of the housing 116, in order to hold the flat spring 114 in place against the housing 116. In certain embodiments, the "T" shaped feature is formed against the bottom surface 402, so that the flat spring 114 is held therein against the bottom surface 402.

In various embodiments, the "T" shaped feature 408 includes a first wall 410, a second wall 412, a third wall 414, a fourth wall 416, a fifth wall 418, a sixth wall 420, a seventh wall 422, an eighth wall 424, a ninth wall 426, and one or more tenth walls 428. In certain embodiments, the various walls 410-428 are made of plastic. In various embodiments, the first wall 410 extends in a first direction, for example horizontally (e.g., in a direction between the driver and passenger sides of the vehicle 100) as the flipper panel 108 is installed in the vehicle 100. Also in various embodiments, the second and third walls 412, 414 extend from opposing ends of the first wall 410, in a perpendicular direction to the first wall 410 (for example, vertically, such as in a direction between the top and bottom of the vehicle 100, as the flipper panel 108 is installed in the vehicle 100). Also in various embodiments, the fourth and fifth walls wall 416, 418 extend from lower ends of the second and third walls 412, 414, respectively, in a direction that is perpendicular to the second and third walls 412, 414 (for example, horizontally as the flipper panel 108 is installed in the vehicle 100). Also in various embodiments, the sixth and seventh walls 420, 422 extend from the fourth and fifth walls 416, 418, respectively, in a direction that is perpendicular to the fourth and fifth walls 416, 418 (for example, vertically as the flipper panel 108 is installed in the vehicle 100). Also in various embodiments, the eighth wall 424 extends between the sixth and seventh walls 420, 422 at a first location, in a direction that is perpendicular to the sixth and seventh walls 420, 422 (e.g., horizontally as the flipper panel 108 is installed in the vehicle 100). In addition, in various embodiments, the ninth wall 426 extends between the sixth and seventh walls 420, 422 at a second location that is below the first location, in a direction that is parallel to the eighth wall 424. Also in various embodiments, the tenth wall 428 extends parallel to the ninth wall 426, at a third location that is below the second location (and, as depicted in FIG. 4, that is below the sixth, seventh, and ninth walls 420, 422, 426, and below the living hinge 406).

In various embodiments, the various walls 410-428 form multiple openings proximate the housing 416 (and, in certain embodiments, against the housing 416) for holding the flat spring 114 in place (in certain embodiments, against the housing 416). In various embodiments, the multiple openings collectively form a "T" shape. Specifically, in accordance with certain embodiments: (i) a first opening 431 is formed by and between the first, second, third, fourth, fifth, sixth, seventh, and eighth walls 410, 412, 414, 416, 418, 420, 422, and 424; (ii) a second opening 432 is formed by and between the sixth, seventh, eighth, and ninth walls 420, 422, 424, and 426; and (iii) a third opening 433 is formed by and between the sixth, seventh, ninth, and tenth walls 420, 422, 426, and 428. In certain embodiments, each of the walls 410-428 are at least partially raised above the housing 116, such that the respective openings 431-433 are disposed direction above and adjacent to the housing 116, to thereby hold the flat spring 114 in place against the housing 116.

In addition, in various embodiments, the flat spring 114 is also "T" shaped. For example, as depicted in FIG. 4, the flat spring includes a first region 441 and a second region 442 that collectively make a "T" shape. Specifically, as depicted, the first region 441 forms a rectangle with relatively longer sides in a first direction (i.e., horizontal as the flipper panel 108 is installed in the vehicle 100), and the second region 444 forms an adjacent rectangle with relatively longer sides in a second direction that is perpendicular to the first direction (i.e., with the second direction being vertical as the flipper panel 108 is installed in the vehicle 100). Also in certain embodiments, the first and second regions 442, 444 are integrally formed for the flat spring 114 as a single, unitary piece.

Also as depicted in FIG. 4, in various embodiments, the first and second regions 441, 442 of the flat spring 114 are configured to fit within and be held in place by the openings 431, 432, 433 of the "T" shaped feature 408. Specifically, in certain embodiments, the first region 441 of the flat spring 114 fits within an upper portion of the first opening 431 and is held in place, by the first, second, third, fourth, and fifth walls 410, 412, 414, 416, and 418. Also in certain embodiments, the second region 442 of the flat spring 114 fits within a lower portion of the first opening 431 as well as the second and third openings 432, 433, and is held in place by the sixth, seventh, eighth, ninth, and tenth walls 420, 422, 424, 426, and 428. In addition, in certain embodiments, when the flat spring 114 is installed within the "T" shaped feature 408, the eighth, ninth, and tenth walls 424, 426, and 428 extend over the flat spring 114 (e.g., the flat spring 114 is slid underneath the eighth, ninth, and tenth walls 424, 426, and 428) to help hold the flat spring 114 into place. Also as depicted in FIG. 4, in certain embodiments, the flat spring 114 extends at least partially over the living hinge 406.

FIG. 5 depicts the flipper panel 108 in a bent position. Specifically, as shown in FIG. 5, the lower region 452 of the housing 116 is shown as bent via the living hinge 406. FIG. 5 also depicts a portion of a top surface 502 of the housing 116. In various embodiments, the top surface 502 comprises a carpet layer for the housing 116 (e.g., on top of and/or opposite the plastic of the bottom surface 402).

Figure 6:
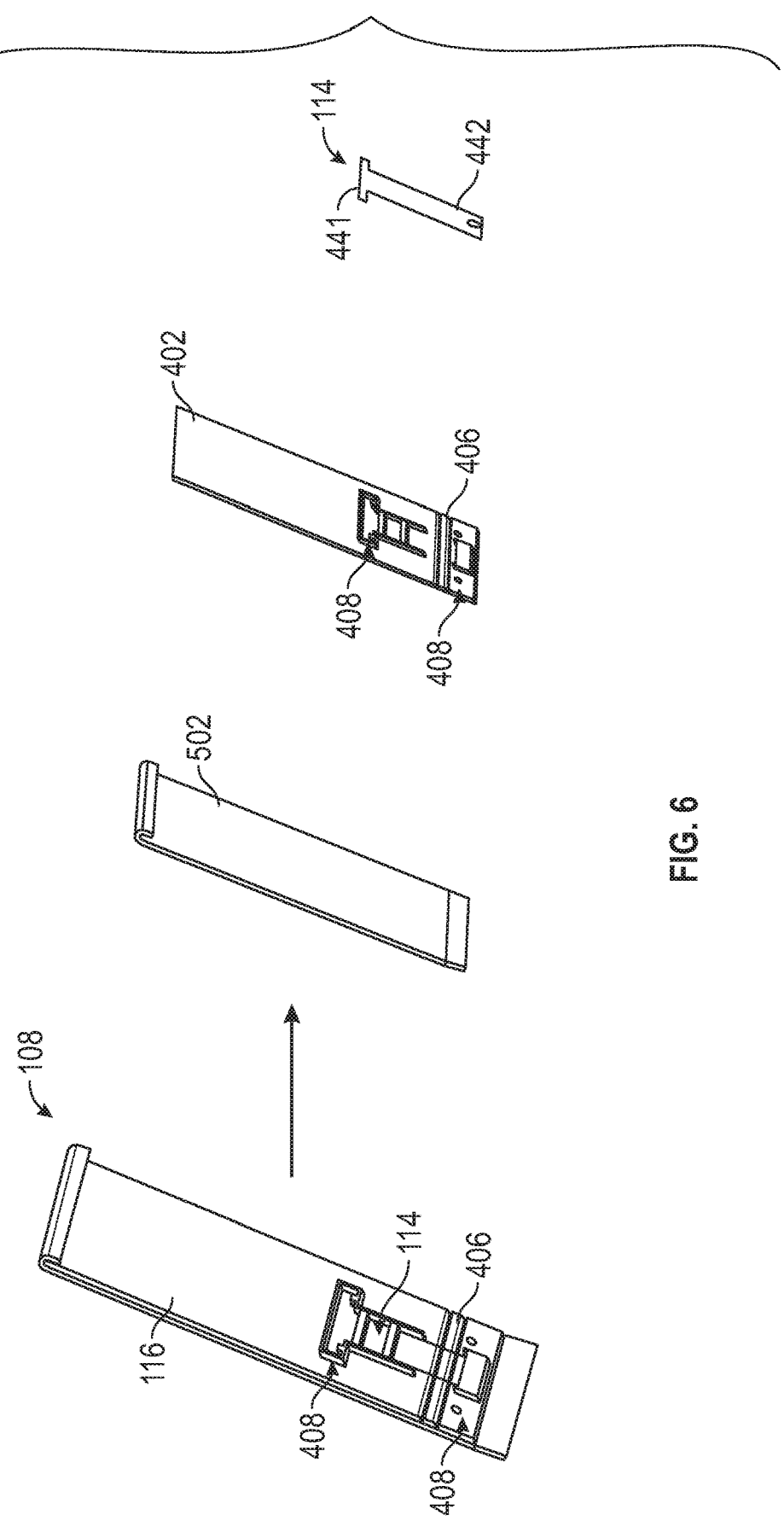

FIG. 6 provides an exploded view of the flipper panel 108, in accordance with exemplary embodiments. Specifically, in the exploded view of FIG. 6, the top surface 502 of the housing (e.g., the carpet layer) is depicted separately from the bottom surface 402 of the housing (e.g., the plastic layer), and both of which are also depicted separately from the flat spring 114, for illustration purposes.

Figure 7:
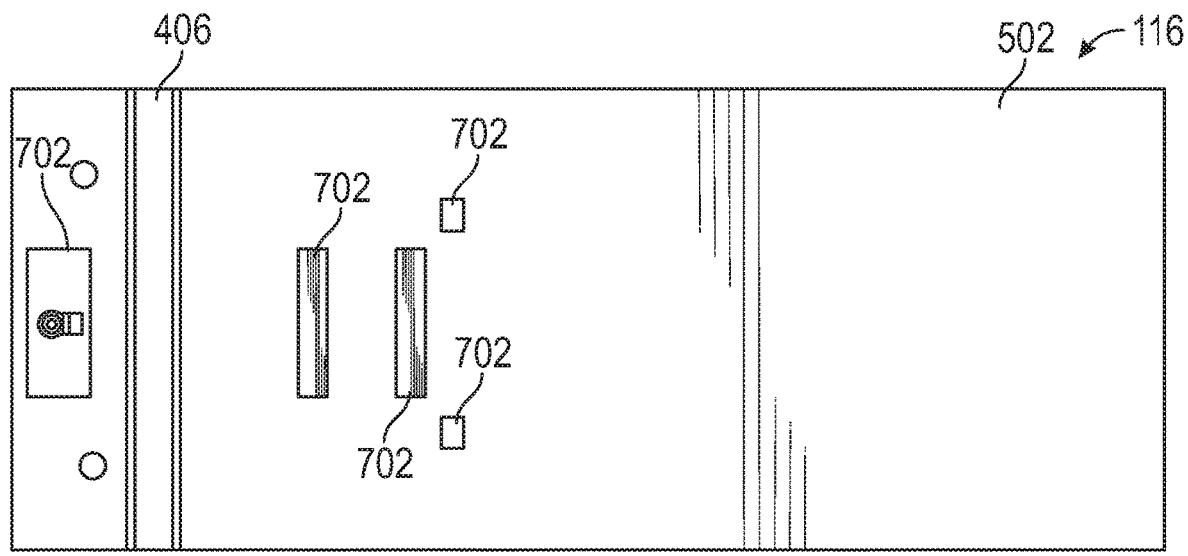
Figure 8:
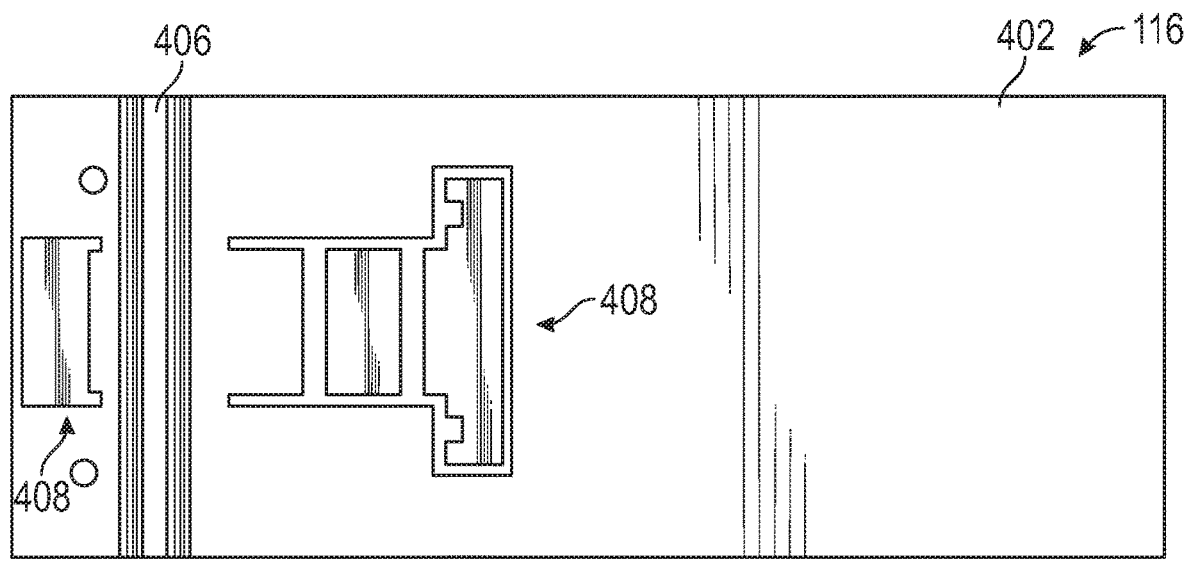
Figure 9:
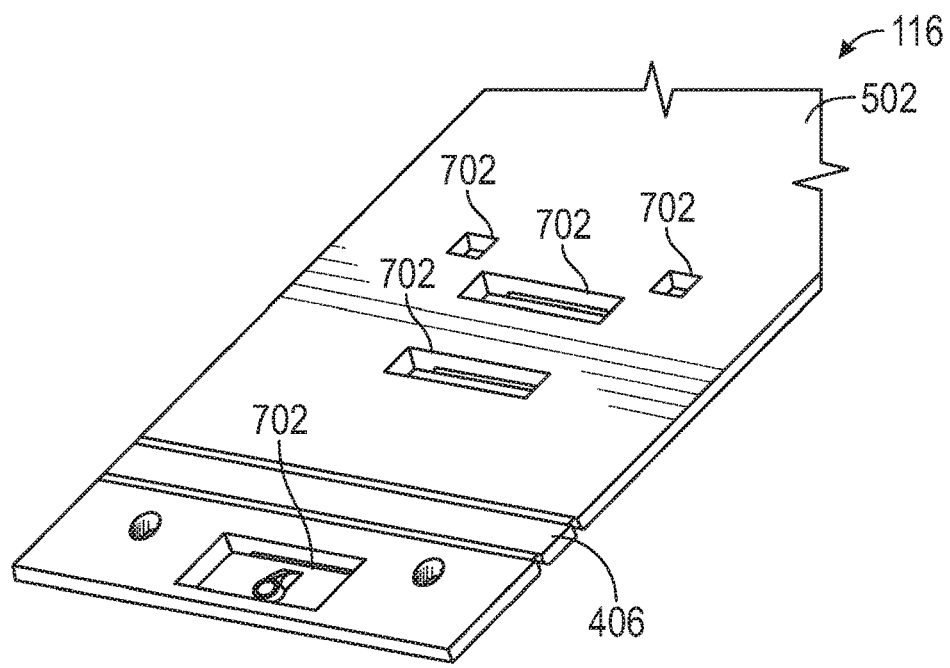
Figure 10:
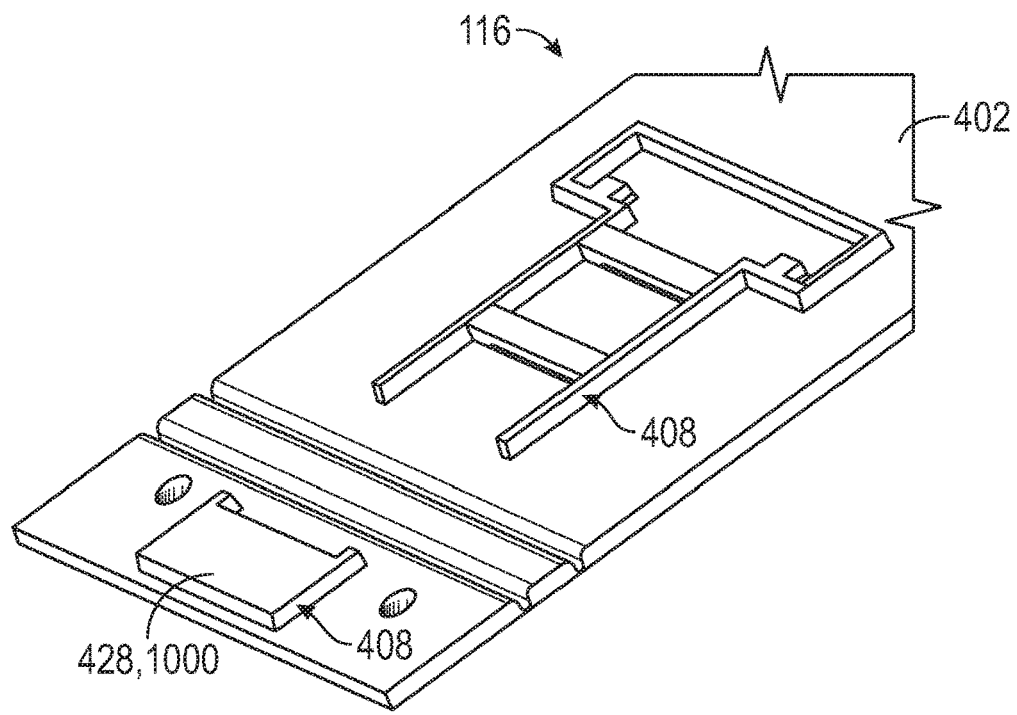

FIGS. 7-10 provide different views of the housing 116 of the flipper panel 108, in accordance with various embodiments. Specifically: FIG. 7 provides a top view of the housing 116 of the flipper panel 108; FIG. 8 provides a bottom view of the housing 116 of the flipper panel 108; and FIGS. 9 and 10 provide isometric views of the housing 116 of the flipper panel 108, in accordance with various embodiments. As shown in FIGS. 7 and 9, in various embodiments, the top surface 502 includes a carpet surface, along with the living hinge 406, and various openings 702 (or indentations) can be seen on the opposing side of the "T" shaped feature 408. In addition, as shown in FIGS. 8 and 10, in various embodiments, the bottom surface 402 includes a plastic surface, with raised walls that form the "T" shaped feature 408, along with the living hinge 406. Also as depicted in FIG. 10, in certain embodiments the one or more tenth walls 428 comprise a raised rectangular region in which an end of the flat spring 114 is installed to prevent movement.

Accordingly, a vehicle is provided having a seating system with a flipper panel. In various embodiments, the seating system includes an occupant seat, a cargo device (e.g., with a storage bin), and a flipper panel that is coupled between the occupant seat and the cargo device. In various embodiments, the flipper panel includes a flat spring as well as a housing that includes a "T" shaped feature for holding the flat spring in place, along with a living hinge for bending the flipper panel (e.g., as the occupant seat moves or bends). In various embodiments, the design of the seating system with the flipper panel allows for a robust solution that provides for potentially reduced packing room and stress concentration and potentially increased stability and life cycle.

It will be appreciated that the systems and vehicles may vary from those depicted in the Figures and described herein. It will similarly be appreciated that the seating system, and components and implementations thereof, may be installed in any number of different types of vehicles, and may vary from those depicted in FIGS. 1-10 and described in connection therewith, in various embodiments.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A flipper panel configured for installation in a seating system of a vehicle that includes an occupant seat and a cargo device, the flipper panel comprising:
   a flat spring; and
   a housing that is configured to be disposed between the occupant seat and the cargo device, and that includes a plurality of walls configured to hold the flat spring in place against the housing when the flipper panel is installed in the seating system for the vehicle.

2. The flipper panel of claim 1, wherein:
   the flat spring is "T" shaped; and
   the plurality of walls form a "T" shaped feature for holding the flat spring against the housing.

3. The flipper panel of claim 1, further comprising a living hinge formed into the housing.

4. The flipper panel of claim 1, wherein the housing comprises:
   a first side having a carpet layer; and
   a second side, opposite the first side, having a plastic layer in which the plurality of walls are disposed to hold the flat spring in place.

5. The flipper panel of claim 1, wherein the plurality of walls define a plurality of openings for holding the flat spring in place against the housing.

6. The flipper panel of claim 5, wherein the plurality of walls are disposed above a surface of the housing, generating the plurality of openings above and against the surface.

7. The flipper panel of claim 5, wherein the plurality of walls include multiple sets of parallel and perpendicular walls that form a plurality of rectangular openings for holding the flat spring in place against the housing.

8. The flipper panel of claim 7, wherein the plurality of walls includes:
   a first wall that extends in a first direction;
   second and third walls that extend from opposing ends of the first wall, in a second direction that is perpendicular to the first wall;
   fourth and fifth walls that extend from lower ends of the second and third walls, respectively, in a third direction that is perpendicular to the second and third walls;
   sixth and seventh walls that extend from the fourth and fifth walls, respectively, in a fourth direction that is perpendicular to the fourth and fifth walls;
   an eighth wall that extends between the sixth and seventh walls at a first location, in a fifth direction that is perpendicular to the sixth and seventh walls;
   a ninth wall that extends between the sixth and seventh walls at a second location that is below the first location, in a sixth direction that is parallel to the eighth wall; and
   a tenth wall that extends parallel to the ninth wall, at a third location that is below the second location.

9. A seating system for a vehicle, the seating system comprising:
   an occupant seat;
   a cargo device; and
   a flipper panel disposed between the occupant seat and the cargo device, the flipper panel comprising:
      a flat spring; and
      a housing that is configured to be disposed between the occupant seat and the cargo device, and that includes a plurality of walls configured to hold the flat spring in place against the housing when the flipper panel is installed in the seating system for the vehicle.

10. The seating system of claim 9, wherein:
    the flat spring is "T" shaped; and
    the plurality of walls form a "T" shaped feature for holding the flat spring against the housing.

11. The seating system of claim 9, wherein:
    the flipper panel further comprises a living hinge formed into the housing; and the housing comprises:
    a first side having a carpet layer; and
    a second side, opposite the first side, having a plastic layer in which the plurality of walls are disposed to hold the flat spring in place.

12. The seating system of claim 9, wherein the plurality of walls define a plurality of openings for holding the flat spring in place against the housing.

13. The seating system of claim 12, wherein the plurality of walls are disposed above a surface of the housing, generating the plurality of openings above and against the surface.

14. The seating system of claim 12, wherein the plurality of walls include multiple sets of parallel and perpendicular walls that form a plurality of rectangular openings for holding the flat spring in place against the housing.

15. The seating system of claim 14, wherein the plurality of walls includes:
    a first wall that extends in a first direction;
    second and third walls that extend from opposing ends of the first wall, in a second direction that is perpendicular to the first wall;
    fourth and fifth walls that extend from lower ends of the second and third walls, respectively, in a third direction that is perpendicular to the second and third walls;
    sixth and seventh walls that extend from the fourth and fifth walls, respectively, in a fourth direction that is perpendicular to the fourth and fifth walls;
    an eighth wall that extends between the sixth and seventh walls at a first location, in a fifth direction that is perpendicular to the sixth and seventh walls;
    a ninth wall that extends between the sixth and seventh walls at a second location that is below the first location, in a sixth direction that is parallel to the eighth wall; and
    a tenth wall that extends parallel to the ninth wall, at a third location that is below the second location.

16. A vehicle comprising:
    a body;
    a propulsion system configured to move the body; and
    a seating system disposed within the body, the seating system comprising:
        an occupant seat;
        a cargo device; and
        a flipper panel disposed between the occupant seat and the cargo device, the flipper panel comprising:
            a flat spring; and
            a housing that is configured to be disposed between the occupant seat and the cargo device, and that includes a plurality of walls configured to hold the flat spring in place against the housing when the flipper panel is installed in the seating system for the vehicle.

17. The vehicle of claim 16, wherein:
the flat spring is "T" shaped; and
the plurality of walls form a "T" shaped feature for holding the flat spring against the housing.

18. The vehicle of claim 16, wherein:
the flipper panel further comprises a living hinge formed into the housing; and
the housing comprises:
    a first side having a carpet layer; and
    a second side, opposite the first side, having a plastic layer in which the plurality of walls are disposed to hold the flat spring in place.

19. The vehicle of claim 16, wherein:
the plurality of walls define a plurality of openings for holding the flat spring in place against the housing; and
the plurality of walls include multiple sets of parallel and perpendicular walls that form a plurality of rectangular openings for holding the flat spring in place against the housing.

20. The vehicle of claim 19, wherein the plurality of walls includes:
    a first wall that extends in a first direction;
    second and third walls that extend from opposing ends of the first wall, in a second direction that is perpendicular to the first wall;
    fourth and fifth walls that extend from lower ends of the second and third walls, respectively, in a third direction that is perpendicular to the second and third walls;
    sixth and seventh walls that extend from the fourth and fifth walls, respectively, in a fourth direction that is perpendicular to the fourth and fifth walls;
    an eighth wall that extends between the sixth and seventh walls at a first location, in a fifth direction that is perpendicular to the sixth and seventh walls;
    a ninth wall that extends between the sixth and seventh walls at a second location that is below the first location, in a sixth direction that is parallel to the eighth wall; and
    a tenth wall that extends parallel to the ninth wall, at a third location that is below the second location.

* * * * *